US012654637B2

(12) United States Patent
Auer et al.

(10) Patent No.: US 12,654,637 B2
(45) Date of Patent: Jun. 16, 2026

(54) METHOD FOR OPERATING A MOTOR VEHICLE

(71) Applicants: Volkswagen Aktiengesellschaft, Wolfsburg (DE); AUDI AG, Ingolstadt (DE)

(72) Inventors: Richard Auer, Bad Harzburg (DE); Holger Näther, Sassenburg (DE); Stefan Schoberer, Mindelstetten (DE); Markus Stolz, Rühen (DE)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 357 days.

(21) Appl. No.: 18/473,636

(22) Filed: Sep. 25, 2023

(65) Prior Publication Data

US 2024/0101057 A1     Mar. 28, 2024

(30) Foreign Application Priority Data

Sep. 26, 2022     (DE) ..................... 10 2022 210 118.9

(51) Int. Cl.
B60R 16/033          (2006.01)
B60L 7/10          (2006.01)
(Continued)

(52) U.S. Cl.
CPC .............. B60R 16/033 (2013.01); B60L 7/10 (2013.01); B60L 58/20 (2019.02); B60R 16/0307 (2013.01)

(58) Field of Classification Search
CPC ... B60R 16/033; B60R 16/0307; B60R 16/03; B60L 7/10; B60L 58/20; B60L 1/00;
(Continued)

(56) References Cited

U.S. PATENT DOCUMENTS

| | | | |
|---|---|---|---|
| 8,629,573 B2 * | 1/2014 | Winkler ................. | B60R 16/03 |
| | | | 307/10.1 |
| 11,936,289 B2 * | 3/2024 | Pfeilschifter ........... | B60L 3/003 |

(Continued)

FOREIGN PATENT DOCUMENTS

| | | | | |
|---|---|---|---|---|
| AU | 2009314272 A1 * | 5/2010 | ............... | B60K 6/48 |
| DE | 102016121829 A1 * | 5/2017 | ............ | B60L 3/0092 |

(Continued)

OTHER PUBLICATIONS

DE-102022206636-A1 English Translation (Year: 2024).*

(Continued)

Primary Examiner — Michael T. Walsh
(74) Attorney, Agent, or Firm — Slayden Grubert Beard PLLC

(57) ABSTRACT

The disclosure relates to a method for operating a motor vehicle, which comprises a high-voltage on-board electrical system and a low-voltage on-board electrical system, which are connected by means of a DC-to-DC converter. The high-voltage on-board electrical system is connected to a battery via a switching circuit, and an electromotive main drive is fed by means of the high-voltage on-board electrical system. An electrical contacting of the battery with the high-voltage on-board electrical system is terminated by means of the switching circuit, and the main drive is operated as a generator, such that electrical energy is fed into the high-voltage on-board electrical system, by means of which electrical energy the low-voltage on-board electrical system is fed via the DC-to-DC converter.

17 Claims, 3 Drawing Sheets

(51) Int. Cl.
    *B60L 58/20*         (2019.01)
    *B60R 16/03*         (2006.01)

(58) Field of Classification Search
    CPC ........ B60L 2210/10; B60L 1/003; B60L 7/02;
                B60L 3/0046; B60L 3/0092; B60L 7/16;
                H02J 2310/48; H02J 9/066; H02J 7/0031;
                                         H02J 9/061
    See application file for complete search history.

(56)                References Cited

U.S. PATENT DOCUMENTS

| | | | | |
|---|---|---|---|---|
| 12,071,086 | B2 * | 8/2024 | Ruppert | B60R 16/033 |
| 12,128,754 | B2 * | 10/2024 | Matsuo | B60L 3/0046 |
| 12,502,980 | B2 * | 12/2025 | Shimosaka | B60L 15/20 |
| 2010/0006360 | A1 * | 1/2010 | Kishimoto | B60K 6/547 |
| | | | | 180/65.21 |

FOREIGN PATENT DOCUMENTS

| | | | | | |
|---|---|---|---|---|---|
| DE | 102017122281 | A1 * | 3/2018 | | B60W 10/20 |
| DE | 102017216635 | A1 * | 3/2019 | | B60L 7/18 |
| DE | 102018006811 | A1 | 3/2019 | | B60R 16/03 |
| DE | 102018216491 | B3 * | 12/2019 | | B60R 16/03 |
| DE | 102018218641 | A1 * | 4/2020 | | B60L 53/12 |
| DE | 102019007030 | A1 | 7/2020 | | B60L 50/60 |
| DE | 102020214725 | B3 | 5/2022 | | B60L 50/60 |
| DE | 102022206636 | A1 * | 1/2024 | | H02M 1/36 |

OTHER PUBLICATIONS

DE-102017216635-A1 English Translation (Year: 2019).*
DE-102018216491-B3 English Translation (Year: 2019).*
DE-102018218641-A1 English Translation (Year: 2020).*
DE-102017122281-A1 English Translation (Year: 2018).*
DE-102016121829-A1 English Translation (Year: 2017).*
AU-2009314272-A1 English Translation (Year: 2010).*
Extended European Search Report, Application No. 23196727.4, 8 pages, Feb. 2, 2024.
German Office Action, Application No. 102022210118.9, 10 pages, Feb. 24, 2023.

* cited by examiner

METHOD FOR OPERATING A MOTOR VEHICLE

CROSS-REFERENCE TO RELATED APPLICATIONS

This application claims priority to German Patent Application No. DE 10 2022 210 118.9, filed on Sep. 26, 2022 with the German Patent and Trademark Office. The contents of the aforesaid Patent Application are incorporated herein for all purposes.

TECHNICAL FIELD

The invention relates to a method for operating a motor vehicle, which comprises a high-voltage on-board electrical system and a low-voltage on-board electrical system, which are connected by means of a DC-to-DC converter. The invention further relates to a motor vehicle and to a computer program product.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Motor vehicles, such as passenger cars, have a main drive for propulsion, with the main drive increasingly comprising an electric motor. In this case, for example, only one or more electric motors are used for propulsion of the motor vehicle, so the motor vehicle is designed as an electric vehicle. In an alternative to this, the motor vehicle additionally comprises an internal combustion engine.

A high-voltage on-board electrical system, which is fed by means of a battery designed as a high-voltage battery, is usually used for supplying current to the electric motor. The high-voltage battery itself has a plurality of battery modules which are usually structurally identical to one another. Each of the battery modules in turn has a plurality of individual batteries, some of which are electrically connected in series and some of which are electrically connected in parallel. Thus, an electrical DC voltage is provided by means of each of the battery modules and is onefold or a multiple of one of the batteries.

In order for the power provided by means of the electric motor to be comparatively large, with the electric currents carried by means of the high-voltage on-board electrical system nevertheless being comparatively low so that a line cross section can be reduced, an electrical DC voltage is usually carried above 400 V by means of the high-voltage on-board electrical system. Therefore, such motor vehicles usually additionally have a low-voltage on-board electrical system, by means of which an electrical DC voltage below 60 V is carried, such as 12 V, for example. The low-voltage on-board electrical system is used to supply components with current which are used to check the high-voltage on-board electrical system so that a malfunction in the high-voltage on-board electrical system and/or in the high-voltage battery can be identified. In this case, the high-voltage on-board electrical system is usually shut down so that danger to persons from comparatively high electrical voltage carried by the high-voltage on-board electrical system can be precluded. The low-voltage on-board electrical system is also used to supply current to further, already developed systems which are already used, for example, in motor vehicles that only have an internal combustion engine. Thus, a redesign of such systems, such as, for example, a multimedia system, is not required, leading to reduced production costs.

Certain functions of the motor vehicle are currently influenced mechanically. In this case, a particular component is mechanically moved by a user of the motor vehicle, such as a driver, and acts on further components of the motor vehicle on the basis of a mechanical coupling. This is, for example, a steering system, wherein a direction of travel of the motor vehicle can be adjusted by means of a steering wheel. In the case of a brake system, there is also a direct coupling, which at least partially uses a hydraulic system. The components required for the corresponding coupling have a comparatively large weight. There is also no design freedom because of such a coupling, and, for example, the position of a steering column is predetermined. As a result, free placement of the steering wheel is not possible, and said steering wheel cannot, for example, be stowed in any manner, in particular in the case of the at least occasionally autonomous travel of the motor vehicle.

In order to remedy this, the use of a sensor for detecting the position of an input device, such as the steering wheel, and converting it into electrical signals are known. Said signals are transmitted by means of an electrical line to an actuator, by means of which the direct influence then follows. It is thus possible to decouple the steering wheel mechanically from front wheels of the motor vehicle. It is also possible in this way to actuate the actuator independently of the input device, for example in the case of autonomous travel of the motor vehicle.

In order to, on the one hand, increase safety of the user in the event of a malfunction and, on the other hand, facilitate maintenance of the motor vehicle, the system associated with the actuator and the input device is operated with the low-voltage on-board electrical system, especially since the energy required for this is comparatively low. If, however, the low-voltage on-board electrical system is no longer fed, the systems operated thereby, such as the steering system, are no longer fed, so a change in a direction of travel of the motor vehicle is no longer possible. For this reason, it may be necessary to design a power supply of the low-voltage on-board electrical system with redundancy, which, however, increases weight and production costs.

SUMMARY

A need exists to provide an improved method for operating a motor vehicle, a corresponding motor vehicle, and a suitable computer program product. The need is addressed by the subject matter of the independent claims. Embodiments of the invention are described in the dependent claims, the following description, and the drawings.

DESCRIPTION

Figure 1:
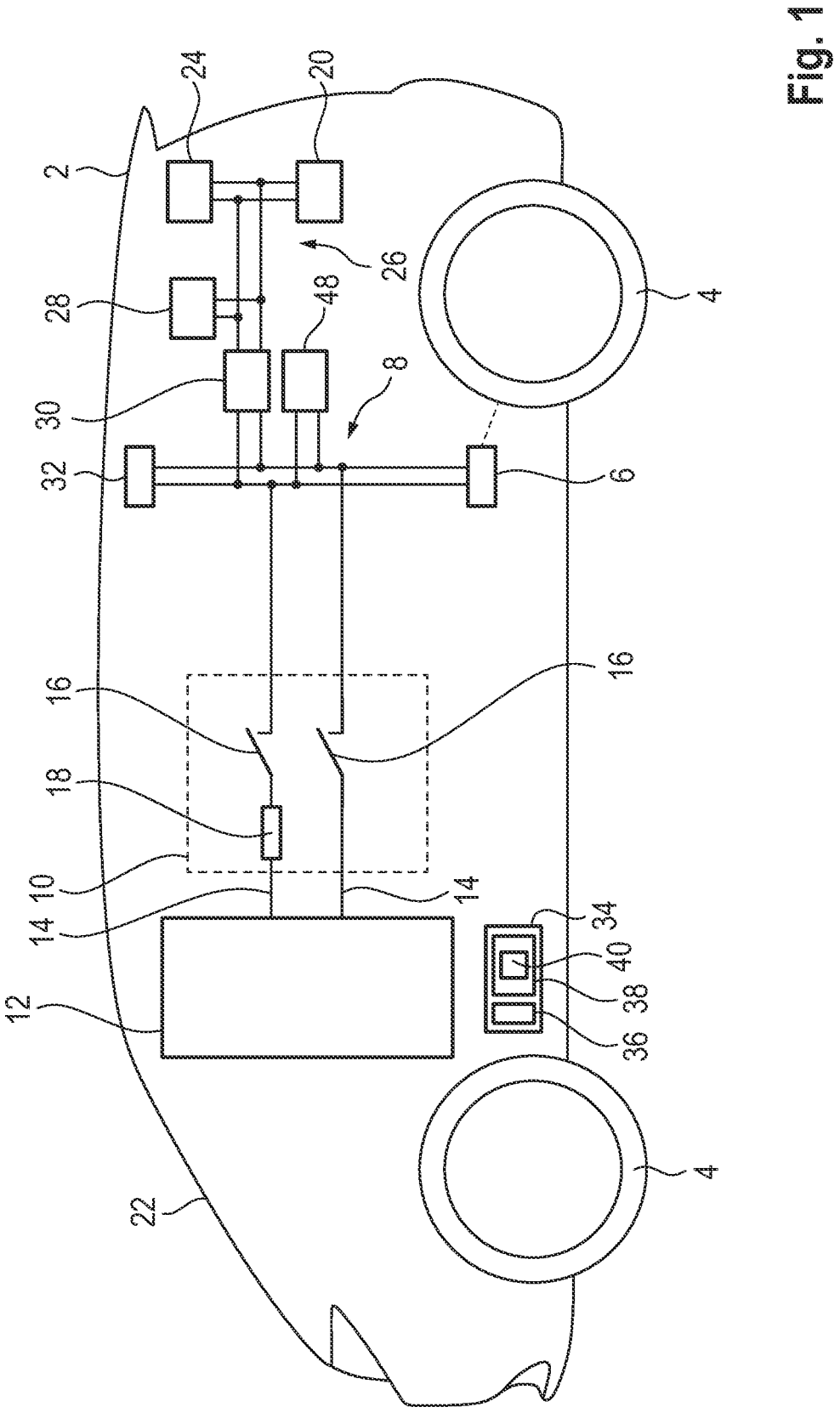
FIG. 1 shows an example of a motor vehicle in a schematically simplified manner.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the method is used for operating a motor vehicle. The motor vehicle is for example land-based and has for example a number of wheels, of which at least one, e.g., a plurality of or all, are driven by means of a main drive. The main drive is for example completely electrical, and the motor vehicle is, for example, an electric vehicle. In some embodiments, the drive additionally has an internal combustion engine, so the motor vehicle is designed as a hybrid motor vehicle. However, the main drive at least comprises an electric motor, by means of which a force required for locomotion of the motor vehicle is provided. The main drive is thus an electromotive main drive.

In some embodiments, at least one, for example several, of the wheels is configured to be controllable. It is thus possible to move the motor vehicle independently of a specific roadway, for example rails or the like. In this case, it is possible to position the motor vehicle substantially in any manner on a roadway, which for example may be made with an asphalt, a tar, and/or concrete. The motor vehicle is, for example, a commercial vehicle, such as a truck or a bus. For example, however, the motor vehicle is a passenger car.

The motor vehicle has a high-voltage on-board electrical system. The high-voltage on-board electrical system is used to feed and thus supply current to the electromotive main drive, which is simply referred to as the main drive hereinafter. For this purpose, the main drive and the high-voltage on-board electrical system are electrically coupled. During operation of the main drive, i.e., if the motor vehicle is to be accelerated or at least to be moved at a constant speed, electrical energy may be generated from the high-voltage on-board electrical system by means of the main drive. The main drive for example comprises an inverter, by means of which the electrical voltage provided by means of the high-voltage on-board electrical system is converted into a voltage which is applied to the electric motor, in particular any electromagnets of the electric motor. The inverter is for example designed as a pulse-controlled inverter. In some embodiments, the high-voltage on-board electrical system has a capacitance, or a capacitance is associated with at least the high-voltage on-board electrical system by means of which voltage is stabilized. A comparatively stable electrical voltage is thus provided even in the case of the different operation of components, such as the main drive, supplied by means of the high-voltage on-board electrical system of the motor vehicle.

The motor vehicle may comprise a battery (e.g., a battery unit) which is an electrical energy store. The battery is for example a high-voltage battery or comprises at least one high-voltage battery. The battery comprises for example two terminals which are used for electrical contacting with further components of the motor vehicle. The terminals are provided and configured to this end. For example, a specific electrical DC voltage is present between the terminals during operation. In some embodiments, the electrical voltage present at the terminals is between 400 V or 800 V.

The battery (also referred to as 'battery assembly') may comprise one or more internal battery units which may be structurally identical to one another. For example, some of the battery units are connected in parallel and/or electrically in series with respect to one another, and the battery units may be connected between the two terminals. The battery units are for example configured to be rechargeable and for example secondary batteries. The battery may comprise, for example, one or more battery modules which each comprise a plurality of the battery units. In some embodiments, the battery modules are structurally identical to one another, and the same number of battery units are associated with each battery module. In this case, the battery units of each battery module are electrically connected in series and/or in parallel such that a specific electrical DC voltage is provided by each battery module. For example, the battery modules are structurally identical to one another, which reduces production costs. The battery modules are for example electrically connected in series such that a multiple of the electrical voltage provided by each of the battery modules is provided by each sub-region. Alternatively or in combination therewith and in some embodiments, at least some of the battery modules are electrically connected in parallel.

The high-voltage on-board electrical system is connected to the battery via a switching circuit, by means of which it is for example possible to establish or interrupt an electrical contacting of the high-voltage on-board electrical system with the battery. The switching circuit has in particular two switches, wherein one of the switches is associated with one of the terminals of the battery, said switches being configured for example as contactors. However, a corresponding switch is at least associated with one of the terminals of the battery. Thus, when the switching circuit is opened, electrical contacting of the battery with the high-voltage on-board electrical system is interrupted. If the switching circuit is closed, i.e., the battery is in electrical contact with the high-voltage on-board electrical system, a transfer of electrical energy between the battery and the high-voltage on-board electrical system is possible, wherein, for example, the high-voltage on-board electrical system is fed by means of the battery, or wherein, for example, electrical energy is transferred from the high-voltage on-board electrical system to the battery, for example in the case of a generator mode of the main drive, as energy recovery. In some embodiments, when the switching circuit is closed, the electrical voltage present on the high-voltage on-board electrical system is equal to the electrical voltage provided by means of the battery, i.e., the electrical voltage present between the terminals of the battery. The switching circuit may for example also be associated with a safety device or the like, so that, in the event of a malfunction of the battery, the latter can be disconnected from the high-voltage on-board electrical system.

The motor vehicle further comprises a low-voltage on-board electrical system, wherein a reduced electrical voltage compared to the high-voltage on-board electrical system, is carried by means of the low-voltage on-board electrical system. In some embodiments, the reduced electrical voltage may be a DC voltage. The electrical voltage of the low-voltage on-board electrical system may in some embodiments be 12 V, 24 V, or 48 V. The high-voltage on-board electrical system and the low-voltage on-board electrical system are in some embodiments electrically connected by means of a DC-to-DC converter so that electrical energy can be exchanged between the high-voltage on-board electrical system and the low-voltage on-board electrical system by means of the DC-to-DC converter. For this purpose, the DC-to-DC converter is for example operated either as a step-up converter or step-down converter. For example, the DC-to-DC converter has a step-up converter and a step-down converter, or it has, for example, a bridge circuit with different switches. The DC-to-DC converter may be configured in some embodiments as a cascaded/stepped buck-boost converter.

In some embodiments, an electrical contacting of the battery with the high-voltage on-board electrical system is terminated/interrupted by means of the switching circuit. In other words, the battery is disconnected or at least the electrical exchange of energy between the high-voltage on-board electrical system and the battery is interrupted. For example, the battery is galvanically isolated from the high-voltage on-board electrical system, or at least the switching circuit is adjusted in such a way that the high-voltage on-board electrical system is no longer supplied by means of the battery. For example, one or more of the possible switches of the switching circuit is opened for this purpose. In summary, at least the electrical battery may therefore be no longer in electrical contact with the high-voltage on-board electrical system.

In some embodiments, the main drive is operated as a generator and consequently provides electrical energy. In this case, the main drive is braked such that mechanical energy is converted into electrical energy by means of the main drive. For example, the electric motor is operated accordingly, and a configuration and/or operation of any inverter is adjusted accordingly. In this case, operation may be carried out in such a way that electrical energy is fed into the high-voltage on-board electrical system by means of the main drive. In this way, at least a part of the high-voltage on-board electrical system is operated by means of the main drive. However, at least some of the electrical energy provided by means of the main drive is used to operate and feed the DC-to-DC converter and said DC-to-DC converter is used to feed the provided electrical energy into the low-voltage on-board electrical system. In summary, the main drive may be operated as a generator so that electrical energy is fed into the high-voltage on-board electrical system and is used to feed the low-voltage on-board electrical system via the DC-to-DC converter.

As a result, in the case of a disconnected battery, i.e., when it is not in electrical contact with the high-voltage on-board electrical system, operation of components of the motor vehicle which are fed by the low-voltage on-board electrical system is made possible. Thus, for example in the event of a failure or a malfunction of the battery, operation of a component of the motor vehicle operated by means of the low-voltage on-board electrical system is nevertheless possible, so that safety and comfort are increased for a user of the motor vehicle. In this case, it is not necessary to provide an additional power supply for the low-voltage on-board electrical system, so that production costs and the weight of the motor vehicle are reduced. If the low-voltage on-board electrical system has a separate power supply, such as a further battery, the demands on these are reduced, and this can, for example, be dimensioned smaller, which reduces production costs. For example, it is possible to use a capacitor as a power supply. Furthermore, a redundancy is provided on account of the method and safety is thus increased.

In some embodiments, the method is carried out only when there is an emergency and/or a malfunction of the battery or of the high-voltage on-board electrical system. In particular, the method is only active in an emergency mode of the motor vehicle, i.e., not in a normal operating mode of the motor vehicle. Alternatively or in combination therewith and in some embodiments, the method is started only when the motor vehicle is still being moved. In this case, for example the generator mode of the main drive is possible, namely in particular up to a standstill of the motor vehicle. For example, a system used to influence at least partially the locomotion of the motor vehicle and/or a function required for the safety of the motor vehicle is operated by the low-voltage on-board electrical system. It is thus possible, on the basis of the method, to operate this system until the motor vehicle is stationary. In this case, however, the motor vehicle is substantially in a safe state and there is no longer a danger due to movement of the motor vehicle.

For example, malfunction of the battery or of the high-voltage on-board electrical system or at least the presence of the emergency mode and/or a situation leading to the start of the emergency mode may be determined in some embodiments. Alternatively, this may be carried out separately, and the method is only then started. In some embodiments, after it is determined that one of these cases applies, the electrical contacting of the battery with the high-voltage on-board electrical system is terminated substantially immediately and the generator mode of the main drive is started. In this way, a self-discharge of possible capacitances of the high-voltage on-board electrical system or of the capacitances associated with the high-voltage on-board electrical system is limited so that the electrical voltage present on the high-voltage on-board electrical system changes only slightly. Substantially unchanged further operation of the DC-to-DC converter is thus possible, which is why production costs for said converter are reduced.

In some embodiments, the method is always carried out when feeding of the low-voltage on-board electrical system by means of the battery is no longer possible and the motor vehicle is in particular being moved. The low-voltage on-board electrical system for example comprises an energy store, such as in particular a battery.

The method may in some embodiments be carried out only if, additionally, the low-voltage on-board electrical system cannot be fed by means of the energy store of the low-voltage on-board electrical system, for example because it is discharged or has a malfunction. In this way, redundancy is provided to the energy store of the low-voltage on-board electrical system by means of the method and said energy store can be designed in a comparably cost-effective manner, or safety requirements for it can be reduced. A further additional energy store for the low-voltage on-board electrical system is also not required, which therefore reduces weight. Maintenance of the motor vehicle is also simplified.

For example, the main drive is operated in such a way that a maximum braking torque is applied so that the motor vehicle is brought to a standstill comparatively quickly. For example, a specific braking torque is predetermined, according to which the main drive is operated. In some embodiments, however, the main drive is operated in such a way that a specific electrical voltage is present on it. In other words, the main drive is operated for example in a voltage-controlled manner. In other words, the electrical voltage provided by means of the main drive is for example predetermined and any inverter may be adjusted accordingly.

The specific, i.e., predetermined, electrical voltage may for example be equal to the (electrical) voltage which is provided by means of the battery in the normal operating mode so that substantially unchanged operation of the high-voltage on-board electrical system and/or of the DC-to-DC converter is made possible. For example, the specific electrical voltage to which the main drive is for example regulated or at least controlled is constant, or this is variable over time. For example, the determined electrical voltage is adjusted from the electrical voltage present on the high-voltage on-board electrical system at the time of the start of the generator mode of the main drive to the electrical voltage which is provided by means of the battery in the normal operating mode, and from which the currently present electrical voltage deviates due to a self-discharge. For example, a substantially linear adjustment takes place in this case.

In some embodiments, the braking torque provided by means of the main drive, which arises from the generator mode, is less than a braking torque which could be applied maximally by means of the main drive. Consequently, the motor vehicle is still being moved or can be moved for a certain period of time. Owing to the voltage-controlled operation of the main drive, an efficiency level may be worsened, for example if a certain braking torque is to be applied additionally as further secondary conditions. If, however, the electrical voltage provided by means of the battery in the normal operating mode is used as the specific electrical voltage, an adjustment of further components of the motor vehicle is not required, and therefore the method can also be implemented in a motor vehicle that has already been manufactured. Alternatively or in combination and in some embodiments, a certain efficiency level, which is in particular comparatively low, is specified during regulation of the generator mode. In this case, for example, there is regulation to the efficiency level, or it is used as secondary conditions. As a result of such a worsened efficiency level, the electrical energy fed into the high-voltage on-board electrical system is reduced, but comparatively hard braking of the motor vehicle occurs. In this case, however, the formation of an overvoltage in the high-voltage on-board electrical system may be avoided on account of the fed energy.

In some embodiments, operation of further components of the motor vehicle is not altered when the method is carried out. For example, however, one or more of the consumers operated by means of the high-voltage on-board electrical system and/or the low-voltage on-board electrical system are stopped. In this case, for example electrical contacting of the consumers with the on-board electrical system is terminated and they are no longer operated. When the electrical contacting is terminated, however, there may be, e.g., no galvanic isolation, but only an electrical current flow between the consumer and the on-board electrical system is prevented. For example, only those consumers, such as systems and/or assistance systems, continue to be operated which have an influence on the movement of the motor vehicle and/or the safety of the motor vehicle, while those consumers which are only present for providing amenities are stopped. Thus, for example, a heater may be switched off. Alternatively or in combination therewith, for example, a multimedia system and/or a seat adjustment is disabled. Consequently, the electrical energy present due to the generator mode of the main drive is made available substantially completely to the consumers required for providing safety, which therefore further increases safety. For example, an air-conditioning compressor which is used to cool the battery continues to be operated so that in particular thermal overloading of the latter is prevented. For example, a windshield wiper and/or a low-beam light continues to be operated so that the driver of the motor vehicle can see the surroundings.

For example, all systems/assistance systems by means of which locomotion of the motor vehicle is influenced continue to operate. Alternatively or in combination therewith, for example, a system by means of which an impact of the motor vehicle with an obstacle can be detected, an airbag or other sensors, which serve to provide safety or safety functions, continue to be operated.

In some embodiments, so-called 'x-by-wire' systems are further maintained in which a position and/or handling of an input device is detected by a sensor and an electrical signal is generated on the basis of which an actuator is actuated. For example, a steering system continues to be operated by means of the energy provided by the low-voltage on-board electrical system. For example, the steering system has steering assistance which is operated by means of the electrical energy. The force to be applied by a user is thus still comparatively low so that the user can still also safely control the motor vehicle. In some embodiments, in the case of the steering system, for example, a position of a steering wheel and/or any other input device used to adjust the direction of travel of the motor vehicle is detected and an actuator is actuated, by means of which a steering angle of wheels of the motor vehicle is adjusted. For example, a mechanical coupling is provided between the steering wheel/input device and the wheels. In some embodiments, there is in particular no mechanical coupling between the steering wheel/input device and the actuator and/or the wheels. Owing to the method, in the event of failure of the battery it is also possible to adjust the direction of movement of the motor vehicle, at least as long as the motor vehicle is moving, which is why safety is increased.

In some embodiments, in particular a brake system continues to be operated, with which, for example by means of a sensor, a position of an input device, such as a foot pedal, is detected, on the basis of which the brakes of the motor vehicle are actuated. For example, brake shoes are adjusted directly and/or a hydraulic system corresponding to the position of the input device/foot pedal is adjusted. For example, there may be no mechanical coupling between the input device, such as the foot pedal, and the hydraulic system or the brake shoes. In some embodiments, there is a mechanical and/or hydraulic coupling between the foot pedal and the brakes, and braking assistance continuing to be operated in particular on the basis of the fed electrical energy so that a force to be applied by a user is comparatively low. In some embodiments, the actuation takes place independently of an actuation of the user/driver so that the motor vehicle is brought to a standstill independently of user/driver. Due to the use of the brake system, the motor vehicle is brought to a standstill in each case in a comparatively short period of time.

For example, all electrical energy which is fed into the high-voltage on-board electrical system by the main drive is fed into the low-voltage on-board electrical system by means of the DC-to-DC converter. In some embodiments, the motor vehicle comprises a dissipation circuit, by means of which further electrical energy is dissipated which is fed into the high-voltage on-board electrical system by the main drive. The dissipation circuit is a circuit for dissipating electrical energy, and in some embodiments is configured to convert electrical energy into thermal energy. For example, the dissipation circuit comprises an electrical resistor which is connected for this purpose and which may be electrically connected in parallel with the main drive. In this way, it is possible to apply a comparatively large braking torque by means of the main drive, wherein an electrical overloading of the high-voltage on-board electrical system, of the low-voltage on-board electrical system and/or of the DC-to-DC converter is avoided.

In some embodiments, the motor vehicle comprises only a single main drive. In some embodiments, the motor vehicle comprises a further main drive, which is configured, in some embodiments, structurally identically to the main drive, or which differs therefrom, in other embodiments. For example, the two main drives are associated with different wheels of the motor vehicle. For example and in some embodiments, the two main drives are electrically connected in parallel to one another, such that electrical energy is fed into the high-voltage on-board electrical system by means of each of the main drives in a generator mode and can be used to feed the DC-to-DC converter. Alternatively and in some embodiments, the further main drive is suitably connected to the DC-to-DC converter via a separate terminal, and the further main drive is used, in a generator mode, in particular via the separate terminal, to feed the DC-to-DC converter.

In other words, as soon as the electrical contacting of the battery with the high-voltage on-board electrical system is terminated, the further main drive may also operated as a generator, the electrical energy provided therewith being fed into the DC-to-DC converter via the separate terminal. There is thus a redundancy here, which therefore further increases safety. In particular, the DC-to-DC converter comprises suitable interconnection for this purpose, and said converter is, for example, of redundant design so that the electrical energy provided by means of the two main drives can be reliably fed into the low-voltage on-board electrical system. In some embodiments, a different electrical voltage is provided with the two main drives so as to provide redundancy, with any controllers being prevented from working against each other. In some embodiments, the electrical energy is fed alternately through the two main drives so as to avoid thermal overloading of them.

For example, the battery comprises two sub-regions which can be electrically connected in series and also electrically in parallel by means of the switching circuit. An electrical voltage of 400 V is provided for example by means of each of the sub-regions. In the normal operating mode, the two sub-regions may be electrically connected in series, such that an electrical voltage of 800 V is provided by means of the high-voltage on-board electrical system. If there is a malfunction of one of the sub-regions, this sub-region is disconnected from the high-voltage on-board electrical system by means of the switching circuit so that only 400 V are carried by means of the high-voltage on-board electrical system. In this way, an emergency mode of the motor vehicle is still possible. In some embodiments, one of the main drives is associated in each case with one of the sub-regions so that, when the electrical contacting of one of the sub-regions with the high-voltage on-board electrical system is cancelled, electrical energy is fed into the high-voltage on-board electrical system by means of the remaining main drive in a generator mode. In some embodiments, each main drive is directly associated with one of the sub-regions and, for example, only the electrical contacting of one of the portions of the battery with the high-voltage on-board electrical system is terminated by the switching circuit, for example that sub-region which has a malfunction. Thus, by means of the remaining main drive and by means of the possible sub-region, it is still possible to feed the high-voltage on-board electrical system.

The motor vehicle may, for example, be a passenger car, a truck or a bus. In some embodiments, the motor vehicle is a forklift truck. The motor vehicle has a high-voltage on-board electrical system. In this case, the high-voltage on-board electrical system is suitable, in particular provided and configured, to carry an electrical DC voltage which is expediently greater than 200 V, 300 or 350 V. For example, the high-voltage on-board electrical system is designed in such a way that different voltage levels can be present on this on-board electrical system. The motor vehicle has an electromotive main drive, which is used to propel the motor vehicle and which is fed by means of the high-voltage on-board electrical system. An electric motor of the main drive is for example electrically connected to the high-voltage on-board electrical system via an inverter of the main drive. However, at least the main drive is fed by means of the high-voltage on-board electrical system. The motor vehicle is therefore for example an electric vehicle or a fuel cell (hydrogen) vehicle. The motor vehicle comprises one or more auxiliary assemblies, such as an air-conditioning compressor, which is likewise operated by means of the high-voltage on-board electrical system. In other words, further consumers are also operated by means of the high-voltage on-board electrical system.

The motor vehicle also has a low-voltage on-board electrical system, which is suitable, for example provided and configured, to carry an electrical voltage, namely a DC voltage, which is lower in relation to the high-voltage on-board electrical system. In this case, the electrical voltage is suitably 12 V, 24 V or 48 V. The electrical voltage carried by means of the low-voltage on-board electrical system in the normal operating mode is lower than the electrical voltage carried by means of the high-voltage on-board electrical system in the normal operating mode, wherein this voltage is also, e.g., less than 60 V and, for example, is 48 V. In some embodiments, one or more auxiliary assemblies of the motor vehicle, i.e., consumers, which, for example, serve as amenities, such as, for example, a multimedia system or an on-board computer, are operated by means of the low-voltage on-board electrical system. In some embodiments, a steering system and/or a brake system are also operated by means of the low-voltage on-board electrical system, which may be configured as so-called 'x-by-wire' systems.

The high-voltage on-board electrical system and the low-voltage on-board electrical system are connected by means of a DC-to-DC converter and are thus in electrical contact with one another. The DC-to-DC converter may be used in this case to transmit electrical energy from the high-voltage on-board electrical system to the low-voltage on-board electrical system, such that the DC-to-DC converter acts as a step-down converter. For this purpose, the electrical voltage present in the high-voltage on-board electrical system is transferred to a voltage level which matches or corresponds at least to the electrical voltage present in the low-voltage on-board electrical system. It is thus possible, for example, to charge an energy store associated with the low-voltage on-board electrical system by means of the high-voltage on-board electrical system. In addition, it is possible, for example, to operate the DC-to-DC converter as a step-up converter and to feed electrical energy from the low-voltage on-board electrical system to the high-voltage on-board electrical system. For this purpose, the electrical voltage provided by means of the low-voltage on-board electrical system is increased, for example to the electrical voltage carried in the high-voltage on-board electrical system.

The motor vehicle may further comprise a battery and a switching circuit, wherein the high-voltage on-board electrical system is connected to the battery, i.e., is electrically connected and thus in electrical contact therewith, via the switching circuit. It is thus possible to adjust or also interrupt the electrical contacting of the battery with the high-voltage on-board electrical system by means of the switching circuit, depending on the configuration of the switching circuit. In some embodiments, the switching circuit has one or more switches for this purpose, which are configured, for example, in the manner of a contactor. In some embodiments, the switching circuit comprises a safety device so that, in the event of a malfunction of the battery, the latter is disconnected from the high-voltage on-board electrical system. In particular, the battery has two terminals, each of which is associated with one of the electrical potentials of the high-voltage on-board electrical system. In some embodiments, one of the switches is associated with each terminal of the battery or at least the terminal by means of which the positive electrical potential is provided.

The battery comprises one or more battery units, each comprising, for example, one or more galvanic elements. In particular, the battery units are configured to be rechargeable and thus as secondary batteries. For example, the battery units are directly electrically connected in parallel and/or in series. As an alternative to this, the battery units are combined to form battery modules and are connected for this purpose, for example, electrically in series and/or in parallel. The battery modules in turn are electrically connected to one another, for example, in parallel and/or partially in series.

The motor vehicle may be operated according to a method in which an electrical contacting of the battery with the high-voltage on-board electrical system is terminated by means of the switching circuit. The main drive is then operated as a generator, such that electrical energy is fed into the high-voltage on-board electrical system, by means of which electrical energy the low-voltage on-board electrical system is fed via the DC-to-DC converter.

The motor vehicle for example comprises a control device, which is suitable, expediently provided and configured to carry out the method. In this case, the control device is realized, for example, by means of a single device or is divided into different devices.

The present teachings also relate to such a control device. For example, the control device is a component of a battery management system. The control device is designed, for example, as an application-specific circuit (ASIC) or comprises a programmable computer, such as a microprocessor. In particular, the control device comprises a memory on which a computer program product is stored, which, when the program is run by a computer, in particular the microprocessor, causes said computer to carry out the method.

The battery has, for example, two sub-regions, which are interconnected by means of the switching circuit. In particular, it is possible here to electrically connect the two sub-regions in parallel and in series, depending on the configuration of the switching circuit. For example, the sub-regions are structurally identical to one another, and/or the battery also has further such sub-regions. Each sub-region expediently has two sub-terminals on which an electrical voltage is present during operation, which is predetermined in particular on the basis of the interconnection of the batteries of each sub-region. By means of the switching circuit, it is possible to connect the two sub-regions electrically in series or electrically in parallel so that, depending on the interconnection, in particular either twice the electrical voltage provided by means of each of the sub-regions or the electrical voltage provided by means of one of the sub-regions is present on the terminals of the battery. In summary, it is thus possible by means of the switching circuit to connect the sub-regions either electrically in series or electrically in parallel, in particular selectively and/or according to current requirements.

The motor vehicle may be designed in such a way that, in the normal operating mode, i.e., when it is moved or used as intended, the sub-regions are electrically connected in series. In some embodiments, an electrical voltage of 800 V is present on the battery and thus also on the high-voltage on-board electrical system, and an electrical DC voltage of 400 V is thus made available in the normal operating mode by means of each sub-region. For example, in order to cancel the electrical contacting of the battery with the high-voltage on-board electrical system, at least one of the sub-regions, for example both or all, is disconnected from the high-voltage on-board electrical system and thus the electrical contacting is terminated.

In some embodiments, a recording or storage medium (data carrier) may comprise a number of commands, which, when executed by a (micro)processor or computer, cause said processor or computer to carry out a method for operating a motor vehicle, which comprises a high-voltage on-board electrical system and a low-voltage on-board electrical system, which are connected by means of a DC-to-DC converter, wherein the high-voltage on-board electrical system is connected to a battery via a switching circuit, and wherein an electromotive main drive is fed by means of the high-voltage on-board electrical system. An electrical contacting of the battery with the high-voltage on-board electrical system is terminated by means of the switching circuit, and the main drive is operated as a generator, such that electrical energy is fed into the high-voltage on-board electrical system, by means of which electrical energy the low-voltage on-board electrical system is fed via the DC-to-DC converter. The processor or computer may be a component of a control circuit or electronics system. The computer for example comprises a microprocessor or is formed by means of said microprocessor. The commands, for example, may be provided as a file, stored on the recording medium which may contain an executable program which, when installed is automatically executed.

The teachings herein further relate to the storage medium. Such a storage medium may be, for example, a CD ROM, a DVD or a Blu-ray disc. As an alternative to this, the storage medium may be an SD card, a USB stick or any other memory which, for example, is rewritable or only writable once. Such a memory is, for example, a flash memory, a RAM or a ROM.

In the context of this discussion, the terms 'processor', and 'circuit' are understood broadly to comprise hardware and hardware/software combinations to provide the respectively discussed functionality. The respective 'processor', and 'circuit' may be formed integrally with each other and/or with further components. For instance, the functionality of the 'processor' and 'circuit' may be provided by a microprocessor, microcontroller, FPGA, or the like, with corresponding programming. The programming may be provided as software or firmware, stored in a memory, or may be provided by dedicated ('hard-wired') circuitry.

Reference will now be made to the drawings in which the various elements of embodiments will be given numerical designations and in which further embodiments will be discussed.

In the embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

FIG. 1 shows a motor vehicle 2 in the form of a passenger car in a schematically simplified manner. The motor vehicle 2 has a plurality of wheels 4, by means of which contact is made with a roadway (not shown in more detail). At least some of the wheels 4 are driven by means of a main drive 6 which comprises an electric motor. The main drive 6 is thus an electromotive main drive. In addition, the main drive 6 has an inverter, namely a pulse-controlled inverter, by means of which the electrical voltage required for supplying the electric motor with current is provided. The inverter itself is supplied with current, i.e., operated, by means of a high-voltage on-board electrical system 8, by means of which an electrical DC voltage of 800 V is provided in the normal operating mode.

The high-voltage on-board electrical system 8 is connected to a battery 12 via a switching circuit 10. In this case, an electrical DC voltage of 800 V is provided at two terminals 14 by means of the battery 12 in the normal operating mode. Each terminal 14 is connected to one of the electrical poles of the high-voltage on-board electrical system 8 via a switch 16 of the switching circuit 10. By already opening one of the switches 16, the electrical contacting of the battery 12 with the high-voltage on-board electrical system 8 is terminated and thus the battery 12 is disconnected from the high-voltage on-board electrical system 8, but with no galvanic isolation being realized when only one of the switches 16 is used. In addition, an electrical safety device 18 of the switching circuit 10 is connected in series with one of the switches 16 so that, in the event of a malfunction, the battery 12 is nevertheless disconnected from the high-voltage on-board electrical system 8. In the normal operating mode of the motor vehicle 2, electrical energy is extracted from the battery 16 for operating the main drive 6 via the switching circuit 10 so that the motor vehicle 2 is being moved. During braking of the motor vehicle 2, on the other hand, in a generator mode of the main drive 6, rotational energy of the wheels 4 is converted into electrical energy, which is fed into the battery 12 via the switching circuit 10.

A steering system 20 is operatively connected to at least some of the wheels 4. The steering system 20 has an actuator, by means of which a steering angle of the associated wheels 4 with respect to a body 22 of the motor vehicle 2 can be adjusted to change a direction of travel of the motor vehicle 2. The actuator itself is connected by means of an electrical line to a sensor which is associated with an input device, namely a steering wheel. The actuator is adjusted according to the electrical signals provided by means of the sensor. Conversely, there is no direct mechanical coupling of the steering wheel with the wheels. In other words, the steering system 20 is designed as an 'x-by-wire' system.

The motor vehicle 2 also has a brake system 24. The brake system 24 comprises a plurality of electrical brakes, one of which is associated with each of the wheels 4. The brakes each have a brake disc and electrically driven brake pads, which can be moved against the brake disc. Furthermore, the brake system 24 has a brake pedal, which is associated with a sensor. The sensor is electrically connected to the brakes, which are actuated according to the position of the brake pedal. The brake system 24 is thus also designed as an 'x-by-wire' system. The steering system 20 and the brake system 24 are electrically connected by means of a low-voltage on-board electrical system 26 and are thus operated by means of the latter. Furthermore, a consumer 28, such as a multimedia system, is connected to the low-voltage on-board electrical system 26, by means of which an electrical DC voltage of 48 V is carried in the normal operating mode.

The low-voltage on-board electrical system 26 and the high-voltage on-board electrical system 8 are connected via a DC-to-DC converter 30, by means of which an exchange of electrical energy between the low-voltage on-board electrical system 26 and the high-voltage on-board electrical system 8 is made possible. It is thus possible to feed the low-voltage on-board electrical system 26 by means of the battery 12 via the high-voltage on-board electrical system 8 and the DC-to-DC converter 30. Another consumer 32 is also operated with the high-voltage on-board electrical system 8. In other words, the electrical DC voltage provided by means of the high-voltage on-board electrical system 8 is used to operate the consumer 32. The consumer 32 of the high-voltage on-board electrical system 8 has an increased energy requirement and is, for example, an electric auxiliary heater.

Figure 2:
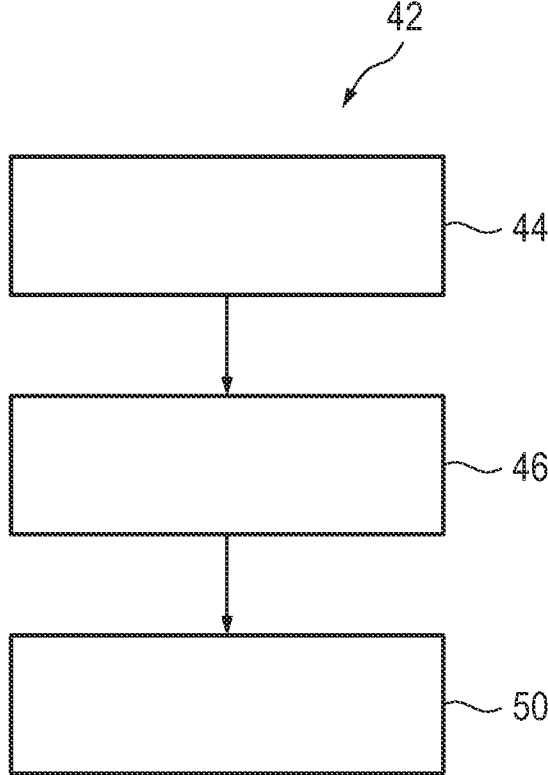
FIG. 2 shows an example of a method for operating the motor vehicle.

The motor vehicle also has a control device 34, which comprises a computer 36 in the form of a programmable microprocessor. The control device 34 also has a storage medium in the form of a memory 38, on which a computer program product 40 is stored. In this case, when the program 40 is run by the computer 36, the latter is prompted to carry out a method 42, shown in FIG. 2, for operating the motor vehicle 2. In other words, the control device 34 is provided and configured to carry out the method 42, and the motor vehicle 2 is operated according to the method 42.

The method 42 begins in a first working step 44, which is started when there is an emergency mode. In this case, the motor vehicle 2 is still being moved, but there is a fault in the battery 12, so further safe operation of the battery 12 is not possible. In the first working step 44, the electrical contacting of the battery 12 with the high-voltage on-board electrical system 8 is terminated by means of the switching circuit 10. For this purpose, the two switches 16 are actuated and the electrical contacting is thus canceled. If, on account of a comparatively extensive defect, one of the two switches 16 should likewise have a malfunction, at least the other of the two switches 16 is actuated accordingly and the contacting is terminated in this way. If both switches 16 have a malfunction, a canceling of the electrical contacting is possible by means of the safety device 18. The safety device 18 is selected in such a way that it triggers a malfunction of the battery 12 and a failure of the switches 16.

Furthermore, the consumer 32 of the high-voltage on-board electrical system 8 and the consumer 28 of the low-voltage on-board electrical system 26 are stopped and are thus not operated further. Thus, no further electrical energy is extracted from the high-voltage on-board electrical system 8 and the low-voltage on-board electrical system 26 by means of said consumers. By means of any capacitances of these two consumers 28, 32, on the other hand, the electrical voltage of the high-voltage on-board electrical system 8 and of the low-voltage on-board electrical system 26 is stabilized at least briefly.

The steering system 20 and the brake system 24 continue to be operated so that any actuation of the steering wheel or of the brake pedal leads to a change in direction of the motor vehicle 2 or to braking of the motor vehicle 2, although there is no mechanical coupling between these and although they are no longer fed with electrical energy with the on-board electrical systems 8, 26. By means of the DC-to-DC converter 30, the electrical voltage carried by the low-voltage on-board electrical system 26 is stabilized, for which electrical energy is extracted from the high-voltage on-board electrical system 8. In other words, the DC-to-DC converter 30 also continues to be operated. In summary, electrical energy is drawn from the low-voltage on-board electrical system 26 by the steering system 20 and the brake system 24, said electrical energy being replenished by the DC-to-DC converter 30, for which electrical energy is drawn from the high-voltage on-board electrical system 8.

If no further feed-in of electrical energy into the high-voltage on-board electrical system 8 were to take place, an actuation of the steering wheel and of the foot pedal would no longer lead to a corresponding influencing of locomotion of the motor vehicle 2 after the remaining electrical voltage of the high-voltage on-board electrical system 8 and of the low-voltage on-board electrical system 26 is reduced, since no more electrical energy is available for operating the actuator and/or the sensor of the steering system 20 and the brake system 24, designed in each case as 'x-by-wire' systems.

In a subsequent second working step 46, the main drive 6 is operated as a generator and the operating mode of the main drive 6 is changed for this purpose. In this case, no more electrical energy is extracted from the high-voltage on-board electrical system 8 by means of the inverter, but the electric motor is operated as a generator so that an electrical voltage is provided by means of said electric motor. This is fed into the high-voltage on-board electrical system 8 by means of the inverter of the main drive 6. The inverter and thus the main drive 6 are operated in such a way that there is a specific electrical voltage on these. In this case, the main drive 6 is regulated in order to provide the specific electrical voltage, for which purpose a braking torque of the main drive 6 is adjusted accordingly. In comparison with this, when there is a feedback in the normal operating mode, the braking torque of the main drive 6 is predetermined, and there is regulation to this.

The specific voltage initially corresponds to the electrical voltage which is present on the high-voltage on-board electrical system 8 at the start of generator mode so that the formation of voltage spikes is avoided. The present electrical voltage is reduced due to the self-discharge of capacitances associated with the high-voltage on-board electrical system 8 and due to the further operation of the steering system 20 and of the brake system 24. The specific voltage is adjusted to the electrical voltage present on the high-voltage on-board electrical system 8 in the normal operating mode of the motor vehicle 2, that is to say to 800 V, for which purpose a linear adjustment is used. Thus, after a certain period of time, the main drive 6 is used to stabilize the electrical voltage present on the high-voltage on-board electrical system 8 at substantially 800 V so that the DC-to-DC converter 30 can continue to be operated at its optimum operating point and losses arising there are reduced. During the second working step 46, energy is also extracted from the high-voltage on-board electrical system 8 by means of the DC-to-DC converter 30 in order to compensate for the energy loss from the low-voltage on-board electrical system 26, which is caused by the further operation of the steering system 20 and brake system 24.

In summary, the main drive 6 is thus operated as a generator so that electrical energy is fed into the high-voltage on-board electrical system 8. Said electrical energy is used to feed the low-voltage on-board electrical system 26 via the DC-to-DC converter 30, from which energy is extracted due to further operation of the steering system 20 and of the brake system 24. Thus, even in the event of failure of the battery 12, steering and braking of the motor vehicle 2 for a driver are nevertheless made possible.

If the motor vehicle 2 has been moving at a comparatively high speed at the start of the method 42 and only slight steering and/or braking interventions take place, the motor vehicle 2 is braked only slightly, despite the generator mode of the main drive 6, on account of the low energy extraction from the two on-board electrical systems 8, 26. In this case, regulation of the main drive 6 is altered so that further energy is fed into the high-voltage on-board electrical system 8 by said main drive. The further energy is not required for operating the DC-to-DC converter 30, the steering system 20 and the brake system 24. In order to prevent an increase in the electrical voltage present on the on-board electrical system 8, a dissipation circuit 48 is activated, which has an electrical resistor that is connected in series with a switching element. These are connected between the two poles of the high-voltage on-board electrical system 8. When the dissipation circuit 48 is activated, the switching element is closed, which is otherwise always open. As a result, the resulting electrical voltage of the high-voltage on-board electrical system 8 is at least partially reduced by means of the dissipation circuit 48, and the further energy is converted into thermal energy. Thus, comparable effective braking of the motor vehicle 2 is also possible if, for example, the driver does not actuate the brake system 24, or if it also fails.

The second working step 46 is carried out as long as the motor vehicle 2 is being moved. If the latter is stationary, the generator mode of the main drive 6 is no longer possible. A third working step 50 is then carried out. In other words, the third working step 50 is carried out when the motor vehicle 2 is stationary and is thus in a safe state. In the third working step 50, electrical energy still present in any capacitances is dissipated, for example via the dissipation circuit 48, or a radio system is actuated for making an emergency call. After the remaining electrical energy of the main drive 6 has been dissipated, the method 42 is terminated. In a further development, the emergency call is already made once or continuously in the second working step 46.

Figure 3:
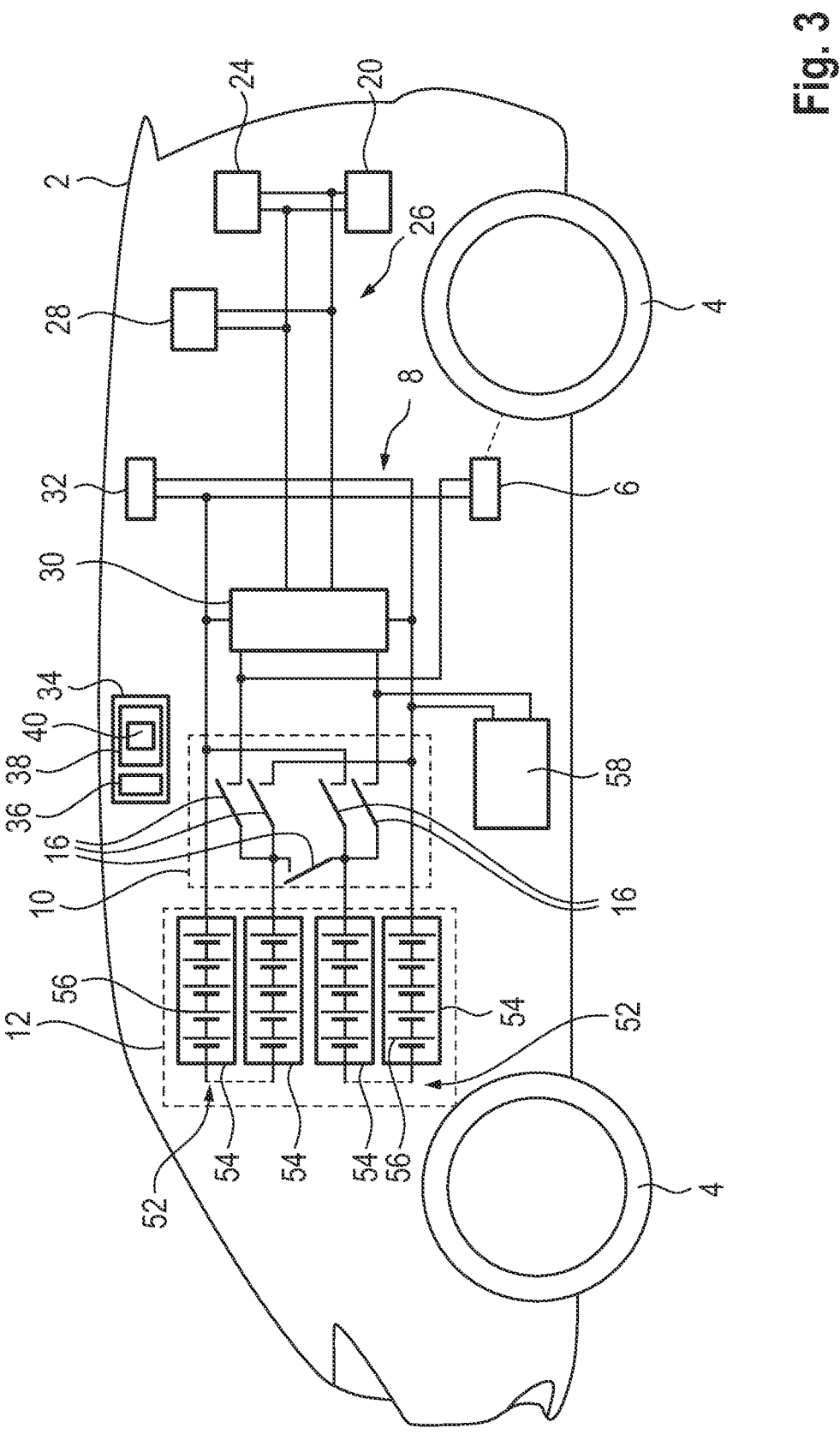
FIG. 3 shows an alternative embodiment of the motor vehicle.

FIG. 3 shows an alternative embodiment of the motor vehicle 2, wherein mainly the battery 12 and the switching circuit 10 are altered. On the other hand, the low-voltage on-board electrical system 26, the steering system 20, the brake system 24 and the consumer 28 of the low-voltage on-board electrical system 26 are not changed. The consumer 32 of the high-voltage on-board electrical system 8 is also not altered, but in this embodiment the dissipation circuit 48 is omitted. The control device 34 is also provided with the computer 36 and the memory 38. The computer program 40 also comprises the commands which, when run, cause the computer 36 to carry out the method 42, but this is adjusted to the changed configuration of the motor vehicle 2.

The battery 12 has two sub-regions 52 which are structurally identical to one another and which each comprise a plurality of battery modules 54, of which only two are shown in each case. The battery modules 54 of each sub-region 52 are electrically connected in series, and each of the battery modules 54 which are structurally identical has a plurality of battery cells 56 which are electrically connected in series. In the embodiment shown in FIG. 2, the battery modules 54 are also provided with the battery cells 56, but these are not divided into the two sub-regions 52.

The switching circuit 10 now has a total of five switches 16, by means of which the two sub-regions 52 can be connected electrically in parallel or electrically in series so that there is either an electrical voltage of 800 V or 400 V present on the high-voltage on-board electrical system 8. Furthermore, the switches 16 can be used to terminate electrical contacting with the high-voltage on-board electrical system 8 separately for each of the sub-regions 52, for which purpose the electrical contacting is terminated for at least one of the poles of each of the sub-regions 52.

The main drive 6, by means of which some of the wheels 4 are driven, is provided unchanged and is connected to a corresponding terminal of the switching circuit 10. In addition, a further main drive 58 is provided, by means of which the remaining wheels 6 are driven. The further main drive 58 is at least partially connected to other terminals of the switching circuit 10. The two main drives 6, 58 are each connected via separate terminals to the DC-to-DC converter 30, which is designed at least partially redundant.

In the normal operating mode, the two main drives 6, 58 are operated by means of the battery 12 via the high-voltage on-board electrical system 8 so that the motor vehicle 2 moves. In this case, a normal operating mode of the steering system 20 and of the brake system 24 is also possible. As soon as the emergency mode starts, the method 42 is likewise carried out, with the electrical contacting of one of the sub-regions 52 or both sub-regions 52 with the high-voltage on-board electrical system 8 being terminated depending on the severity of the fault of the battery 12.

In the second working step 46, both main drives 6, 58 are operated as generators, the DC-to-DC converter 30 being fed by means of said main drives independently. Thus, further operation of the steering system 30 and of the brake system 24 in the second working step 46 is also possible here, even in the event of a failure of one of the main drives 6, 58, so there is redundancy.

The invention is not limited to the exemplary embodiments described above. Rather, other variants of the invention can also be derived therefrom by a person skilled in the art without departing from the subject matter of the invention. In particular, all individual features described in connection with the individual exemplary embodiments can also be combined with one another in other ways without departing from the subject matter of the invention.

LIST OF REFERENCE NUMERALS

2 Motor vehicle
4 Wheel
6 Main drive
8 High-voltage on-board electrical system
10 Switching circuit
12 Battery
14 Terminal
16 Switch
18 Safety device
20 Steering system
22 Body
24 Brake system
26 Low-voltage on-board electrical system
28 Consumer of the low-voltage on-board electrical system
30 DC-to-DC converter
32 Consumer of the high-voltage on-board electrical system
34 Control device
36 Computer
38 Memory
40 Computer program product
42 Method
44 First working step
46 Second working step
48 Dissipation circuit
50 Third working step
52 Sub-region
54 Battery module
56 Battery cell
58 Further main drive The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating an electric vehicle, which comprises a high-voltage on-board electrical system and a low-voltage on-board electrical system, which are connected by a DC-to-DC converter, wherein the high-voltage on-board electrical system is connected to a battery via a switching circuit, wherein an electromotive main drive is fed by the high-voltage on-board electrical system, and wherein the low-voltage on-board electrical system connects to at least one system used to influence at least partially the locomotion of the motor vehicle and/or a function required for the safety of the motor vehicle, the method comprising:
   determining an emergency mode and/or a situation leading to the start of the emergency mode; and
   upon determining the emergency mode, selectively:
      terminating an electrical contacting of the battery with the high-voltage on-board electrical system by the switching circuit, and
      operating the main drive as a generator, such that electrical energy is fed into the high-voltage on-board electrical system and into the low-voltage on-board electrical system via the DC-to-DC converter at least until the electric vehicle reaches a standstill.

2. The method of claim 1, wherein the main drive is operated in such a way that there is a specific electrical voltage present at the main drive.

3. The method of claim 2, wherein some consumers fed by one or more of the high-voltage on-board electrical system and the low-voltage on-board electrical system are disabled.

4. The method of claim 3, wherein one or more of a steering system and a brake system continues to be operated.

5. The method of claim 2, comprising: further electrical energy is fed into the high-voltage on-board electrical system by the main drive and is dissipated by a dissipation circuit.

6. The method of claim 2, wherein the DC-to-DC converter is fed via a separate terminal using a further main drive.

7. The method of claim 1, wherein one or more consumers fed by one or more of the high-voltage on-board electrical system and the low-voltage on-board electrical system are disabled.

8. The method of claim 7, wherein one or more of a steering system and a brake system continues to be operated.

9. The method of claim 8, comprising: further electrical energy is fed into the high-voltage on-board electrical system by the main drive and is dissipated by a dissipation circuit.

10. The method of claim 8, wherein the DC-to-DC converter is fed via a separate terminal using a further main drive.

11. The method of claim 7, comprising: further electrical energy is fed into the high-voltage on-board electrical system by the main drive and is dissipated by a dissipation circuit.

12. The method of claim 7, wherein the DC-to-DC converter is fed via a separate terminal using a further main drive.

13. The method of claim 1, comprising: further electrical energy is fed into the high-voltage on-board electrical system by the main drive and is dissipated by a dissipation circuit.

14. The method of claim 13, wherein the DC-to-DC converter is fed via a separate terminal using a further main drive.

15. The method of claim 1, wherein the DC-to-DC converter is fed via a separate terminal using a further main drive.

16. A non-transitory medium comprising commands, which, when executed by a processor of a motor vehicle, cause the processor to carry out the method of claim 1.

17. An electric vehicle, which comprises:
a high-voltage on-board electrical system,
a low-voltage on-board electrical system;
a DC-to-DC converter, the DC-to-DC converter connecting the high-voltage on-board electrical system and the low voltage on-board electrical system;
a switching circuit;
a battery;
an electromotive main drive; and
at least one system used to influence at least partially the locomotion of the motor vehicle and/or a function required for the safety of the motor vehicle; wherein
the high-voltage on-board electrical system is connected to the battery via the switching circuit; wherein
the electromotive main drive is fed by the high-voltage on-board electrical system; and wherein
the low-voltage on-board electrical system connects to the at least one system used to influence at least partially the locomotion of the motor vehicle and/or a function required for the safety of the motor vehicle; wherein
the electric vehicle is configured to:
determine an emergency mode and/or a situation leading to the start of the emergency mode; and
upon determining the emergency mode, selectively:
   terminate an electrical contacting of the battery with the high-voltage on-board electrical system by the switching circuit; and
   operate the main drive as a generator, such that electrical energy is fed into the high-voltage on-board electrical system and into the low-voltage on-board electrical system via the DC-to-DC converter at least until the electric vehicle reaches a standstill.

* * * * *